(12) United States Patent
Ross

(10) Patent No.: US 7,000,531 B2
(45) Date of Patent: Feb. 21, 2006

(54) NUTCRACKER

(76) Inventor: Nadine Ross, 25055 Highway 395 North, Kettle Falls, WA (US) 99141-9567

( * ) Notice: Subject to any disclaimer, the term of this patent is extended or adjusted under 35 U.S.C. 154(b) by 329 days.

(21) Appl. No.: 10/678,617

(22) Filed: Oct. 6, 2003

(65) Prior Publication Data

US 2005/0072323 A1    Apr. 7, 2005

(51) Int. Cl.
*A23N 5/00*    (2006.01)

(52) U.S. Cl. ............................. 99/571; 99/580; 99/581; 426/482

(58) Field of Classification Search .................. 99/571, 99/580, 568, 628, 581; 426/482, 483; 100/242, 100/240, 245; 269/43, 266, 271, 259, 265
See application file for complete search history.

(56) References Cited

U.S. PATENT DOCUMENTS 4,182,226 A * 1/1980 Sigas .......................... 99/578

* cited by examiner

*Primary Examiner*—Reginald L. Alexander
(74) *Attorney, Agent, or Firm*—Keith S. Bergman; William A Jeckle

(57) ABSTRACT

A nutcracker for simultaneously cracking a plurality of similar nuts in a single discreet operation provides a five sided box-like base defining a chamber having an open top, carrying a rigid bottom plate bottom and defining a slot in the front side extending downwardly to the bottom for nut shell removal. One or more spacers configured to fit within the cracking box chamber above the bottom plate, defining similar medial orifices and having different vertical thicknesses are stacked on the bottom plate to define a cracking chamber having a depth of eighty to ninety percent of the average height of nuts to be cracked. A striker plate having a non-resilient body with peripheral configuration to cover the orifice of the spacer and an upstanding handle manually impacts on the uppermost spacer to crack nuts in the cracking chamber.

9 Claims, 2 Drawing Sheets

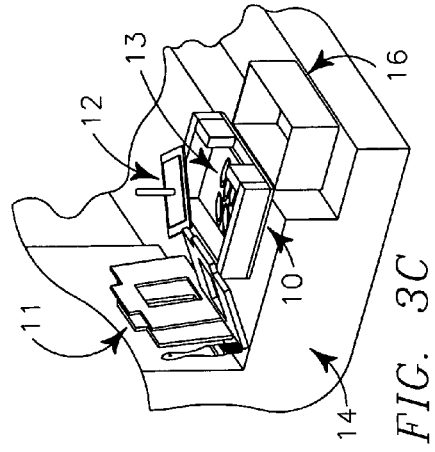
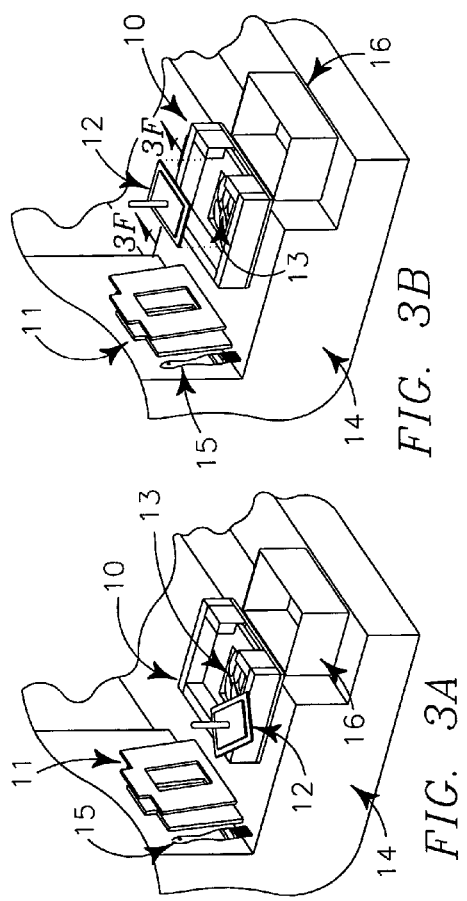
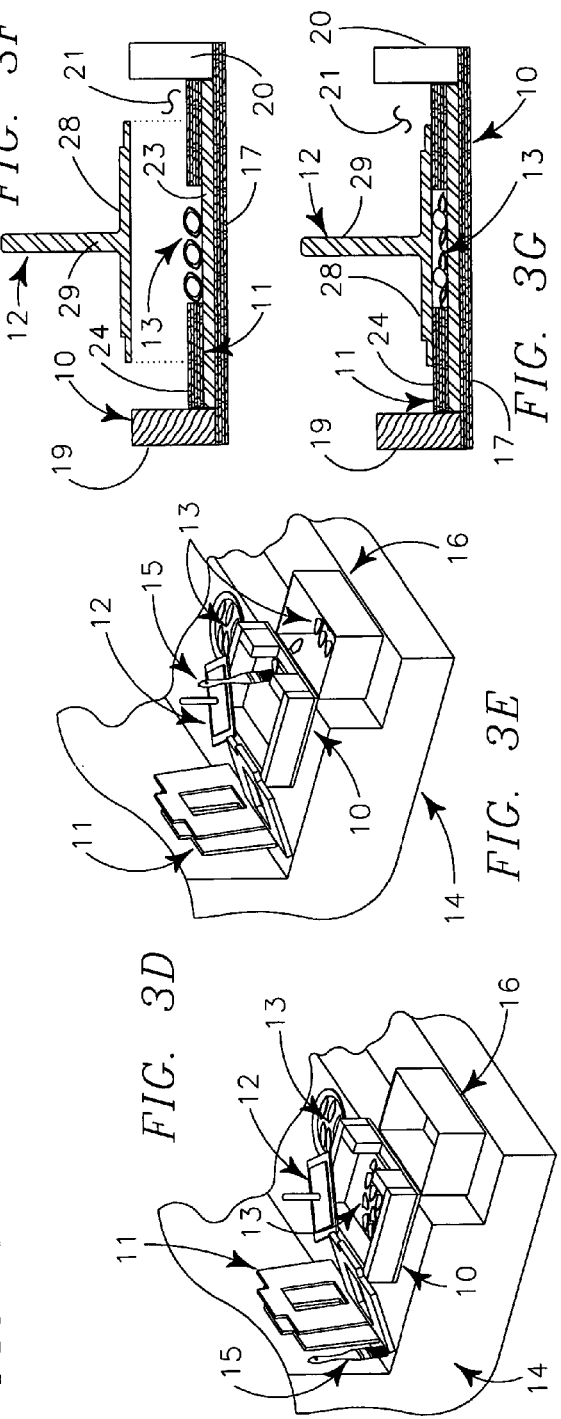

NUTCRACKER

BACKGROUND OF INVENTION

1. Related Applications

There are no applications related hereto heretofore filed in this or any foreign country by the Applicant.

2. Field of Invention

This invention relates generally to food apparatus and more particularly to impact type shell openers to aid in removal of shells from a plurality of smaller brittle shelled nuts in a single discreet operation.

3. Background and Description of Prior Art

Since the earliest times of human history nuts have provided a human food stuff, commonly of a quite desirable nature, and still are of substantial importance as a food stuff in various parts of the world. Since nuts by definition comprise the seed or fruit of a plant comprising a kernel surrounded by a more hard and usually frangible shell that does not split open at maturity and since only the kernel is edible, removal of nut shells from nut kernels has long presented a problem. Responsive to the problem many and various apparatus have been developed and become known to remove shells from nuts and those devices commonly have been generically designated as "nutcrackers". The term "nutcracker" is used herein in this generic sense without reference to any particular method or means of opening or removing a nut shell or to any particular type of nut or nut shell to be opened as removed.

Most nutcrackers heretofore known have been designed and structured either to crack or open individual nuts in a single discreet operation such as for an individual consumer or to crack substantial numbers of nuts in a continuous process such as in a commercial nut cracking process. The instant nutcracker provides a device for cracking a quantity of nuts of up to a few pounds in a single discreet operation such as for a user desiring medial quantities of nut meats for home use or for small commercial operations while yet providing the primary beneficial features of both the individual and commercial types of nutcrackers.

One particular problem with many individual nutcrackers has been the containment and collection of shell debris resulting from the cracking operation. Normally a nut shell to be crackable must be reasonably brittle and when such a shell is cracked by either impact or leverage type nutcrackers a shell at the time of cracking tends to break into a plurality of pieces that are generally somewhat randomly dispersed about the cracking mechanism with sufficient force that they tend to be widely spread. This tends to make the nut shell debris difficult to collect for disposition. Additionally during the cracking process the nut meats commonly are somewhat broken apart and the broken nut meats tend to be randomly intersperced with the cracked shell debris to make more difficult separation of the nut meats from the shell debris and collection of the nut meats. The instant invention solves this problem by providing a cracking chamber in which the nuts being cracked are substantially contained during the cracking operation so that both the shell debris and nut meats after the cracking operation are maintained within the cracking chamber to make it easier to separate the nut meats from the shell debris and collect both for disposition.

It has heretofore been known, especially with individual nut cracking devices, to containerize a nut during the cracking process. The nutcrackers that have done this, however, generally have been of a compound complex nature which increases their cost and makes their operation more difficult and time consuming. In distinguishment, the instant invention provides a simple chamber in which a plurality of nuts are cracked by impacting while being continuously contained.

In non-commercial nutcrackers impact type cracking of nuts is generally faster and more efficient than leverage type compression cracking, but in general with either type of such prior nutcrackers there has not been mechanical control limiting the cracking force of either an impact or a compressive nature. The only control available has been by possible manual manipulation of the cracking tool by the operator which has not been effective or efficient. The instant nutcracker causes cracking by use of an impact type force, but while so doing mechanically limits the distance through which that force may be applied to the shells of nuts to be cracked. This mechanical limitation not only tends to maintain the cracked nutshells in larger pieces but also tends to maintain nut meats within the cracked shells in larger more desirable pieces so that both components may be more easily separated after the cracking process than they could be with previously known impact type cracking process.

To accomplish mechanical limitation of the distance through which a cracking force operates on a group of nut shells, I provide a plurality of spacers carried in a cracking box and defining a similarly configured and positioned medial cracking chambers so that a plurality of such frames may be stacked upon each other to define a cracking chamber of adjustably variable height. The nuts to be cracked and carried within the cracking chamber are impacted by a striker plate of greater areal size than the cracking chamber so that the cracking plate may not pass within the cracking chamber.

My invention lies not in any one or combination of the foregoing features but rather in the synergistic combination of all of its structures which necessarily give rise to the functions flowing therefrom as hereinafter claimed.

SUMMARY OF INVENTION

My nutcracker provides a five sided box-like base having an open top and defining a medial slot in its forward wall for removal of nut shells. The base carries a rigid bottom plate having a peripheral configuration substantially the same as the exposed internal surface of the bottom. A plurality of flat planar spacers having various thickness is provided for use with the base. Each spacer has a peripheral configuration substantially the same as the bottom plate carried in the base and defines similar medial orifices of the same size to define a cracking chamber when one or more spacers are placed in stacked array on the bottom plate. Each spacer preferably provides an outwardly extending handle-like tab configured to extend forwardly through the orifice defined in the front side of the base. A cracking plate having a flat planar head with a peripheral configuration somewhat geometrically similar to but larger than the cracking chamber defined by one or more spacers and with a medial upwardly projecting manipulative handle is associated with the nutcracker system to impact nuts to cause actual cracking.

For use the nut cracking system is assembled with the bottom plate in the base and a plurality of spacers stacked on the bottom plate to a depth that allows approximately 10% to 20% of the average vertical dimension of a plurality of nuts to be cracked to extend above the upper surface of the upper spacer. The cracking chamber defined by the spacers is then loosely filled with a single layer of a plurality of nuts and the striker plate is manually manipulated with a downwardly impacting motion to impact on the upper spacer over the upper orifice defined by the cracking chamber. Shells of the nuts within the cracking chamber generally then will be shattered, and if not, the impacting operation may be repeated until the shells are sufficiently shattered. After substantially all of the shells and nuts in the cracking chamber are cracked, the nut meats are manually separated from the shells and picked out of the cracking chamber for use. Thereafter the spacers are vertically removed from the base and the nut shells on the bottom plate are removed through the orifice defined in the forward wall of the base by aid of an auxiliary brush to a waste bin positioned below and forwardly adjacent to the base for subsequent disposition. The cracking operation then is repeated in the same fashion until all desired nuts are cracked.

In creating such a device, it is:

A principal object to provide a nutcracker system to crack a plurality of smaller or brittle shelled nuts in a single discreet operation.

A further object is to provide such a cracking system that cracks such nuts by manually powered impact type force.

A further object is to provide such a nut cracking system that mechanically limits the distance that an impacting force is applied to the nut shells to provide a maximum shell cracking force with a minimum break up of or damage to nut kernels within the cracked shells.

A further object is to provide such a nut cracking system which substantially contains the plurality of nuts during the cracking operation to prevent dispersement of nut shells and meats beyond a peripherally defined cracking chamber.

A still further object is to provide such a nut cracking system wherein the depth of the cracking chamber may be regulated by selection and stacking of one or more spacers having similar medial orifices to define the cracking chamber.

A still further object is to provide such a nut cracking system wherein the spacers defining the cracking chamber can be removed from a supporting base after a cracking operation to allow easy removal of cracked nut shells from the supporting base.

A still further object is to provide such a nut cracking system that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that it's essential features are susceptible of change in design, structural arrangement and ordering with only one preferred and practical embodiment of the best known mode being illustrated and specified as is required.

BRIEF DESCRIPTION OF DRAWINGS

In the accompanying drawings which form a part hereof and wherein like numbers of reference refer to similar parts throughout:

FIGS. 3A–3E are similar isometric views of the nutcracker system of FIG. 1 showing the cracking process of the instant nutcracker system.

FIG. 3F is an elongately extending vertical cross-sectional view through the nutcracker system of FIG. 3B, taken on the line 3F—3F thereon in the direction indicated by the arrows, with the striker plate moving to impact unshelled nuts in the cracking chamber.

FIG. 3G is a laterally extending vertical cross-sectional view through the nutcracker system of FIG. 3B, taken as on the line 3F—3F thereon in the direction indicated by the arrows, with the striker plate moving away from shelled nuts in the cracking chamber.

DESCRIPTION OF THE PREFERRED EMBODIMENT

Figure 1:
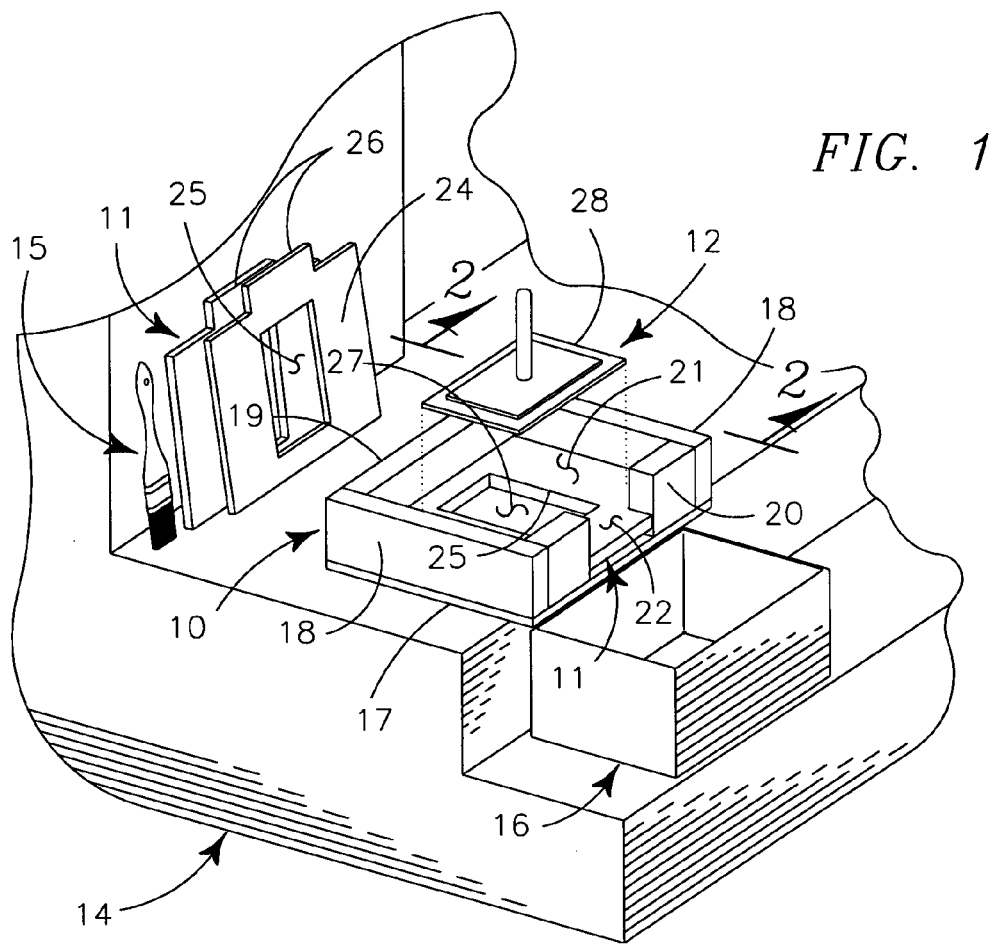
FIG. 1 is an isometric view of my nut cracking system showing its various parts, their configuration and relationship.
Figure 2:
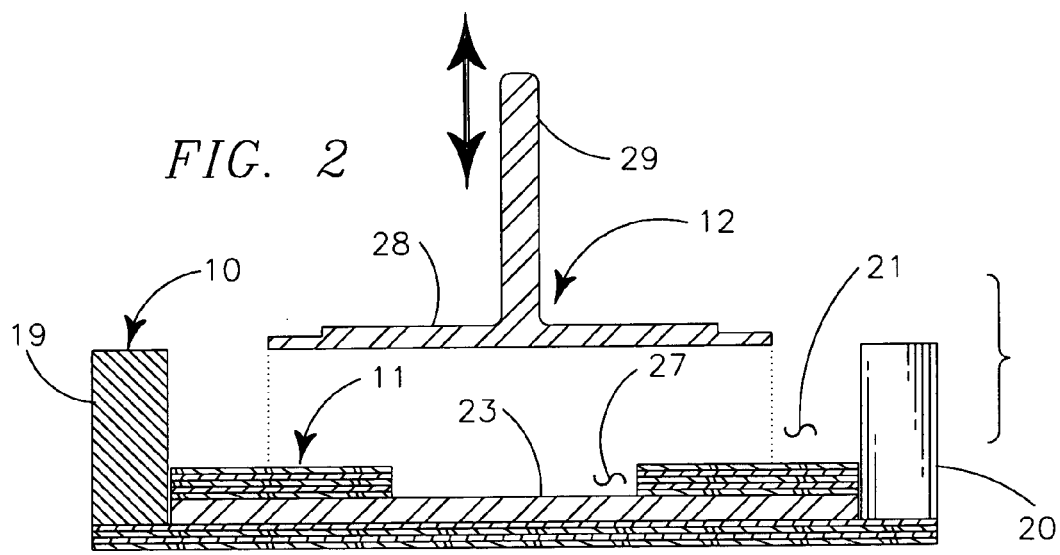
FIG. 2 is an elongate vertical cross-sectional view through the nutcracker of FIG. 1, taken on the line 2—2 thereon in the direction indicated by the arrows.

My nutcracker system generally provides base 10 defining an open top chamber to stackably receive one or more similar spacers 11 defining medial orifices to form a cracking chamber for nuts 13 when impacted by striker plate 12. An associated support 14, brush 15 and waste container 16 make the cracking process more convenient, but are not a necessary part of the nutcracker system.

Base 10 comprises a five-sided open top box formed by bottom 17, similar opposed sides 18, back 19 and front 20 all structurally joined at the immediately adjacent surfaces of each base element to define open top spacer chamber 21. Front 20 defines medial slot 22 preferably depending to the upper surface of bottom 17 to aid in removal of cracked nut shells from the cracking chamber formed by spacer chamber 21. To crack quantities of approximately one to three pounds of smaller brittle shelled nuts, such as almonds and walnuts, the external dimensions of the base should be approximately 17 inches in length, 13 inches in width and 4 inches in height. I prefer to form the base of wood material and when so formed the spacer chamber preferably has a length of approximately 14 inches, a width of approximately 10 inches and a height of approximately 3 inches.

Bottom plate 23 is carried on the upper surface of bottom 17 and preferably is coextensive with the exposed upper surface of the bottom 17 to require, in the instance illustrated a length of approximately 14 inches and a width of approximately 10 inches. This bottom plate 17 preferably is formed of some hard durable material of substantial density to provide a surface that aids the impact type cracking of frangible nut shells and to provide some inertia resistive to an impact force transmitted by impacted nuts on the bottom plate. The material of preference for the bottom plate is a metal such as iron or steel of approximately ½ inch thickness, which in the preferred rectilinear configuration of 14 by 10 inches will weigh approximately eighteen pounds to provide substantial inertia resisting impact force generated motion.

Spacers 11 provide flat planar bodies 24 having a general peripheral configuration substantially similar to the exposed upper surface of bottom 17 so as to fit immediately inwardly adjacent the inner vertical surfaces of base 10 and the upper horizontal surface of bottom plate 23. Each spacer 11 defines a medial orifice 25, in the instance illustrated of rectilinear configuration with an elongate dimension of approximately 11 inches and a width of approximately 9 inches, though this dimensioning is not critical and may vary so long as the periphery of the spacer about the orifice is continuous. The orifice 25 preferably is symmetrically positioned in the body 24, with substantially equal body portions on each side of the orifice and substantially equal body portions on each end of the orifice, which need not necessarily be the same as the side portions. Preferably a forwardly projecting handle-like protuberance 26 is provided on the forward edge of each spacer 11 to aid in manipulating the spacer 11 in and out of chamber 21 of the base 10. If a spacer 11 of the type indicated is used, the handle-like portion 26 must of necessity have a total lateral extension less than the width of medial slot 22 in front 20 of the base 10 and must be positioned for the protuberance 26 to extend through that slot 22 to allow proper operation of the nutcracker.

A plurality of spacers 11, all having similar configuration as described, but preferably at least some having different thicknesses, are provided for use with the nutcracker system to allow positioning of one or more spacers in stacked array on bottom plate 23 to provide a cracking chamber 27 of variable depth. Preferably the spacers 11 have thicknesses varying by quarter inch amounts from ¼ inch to at least 1 inch to accommodate proper cracking of nuts having various average diametrical size, different shapes and different shell fractionating characteristics.

Striker plate 12 provides planar plate-like body 28, preferably having a peripheral configuration geometrically similar to that of orifice 25 in spacers 11, which in the instance illustrated would be rectilinear. The plate 28 for effective operation must have a dimension that allows it to freely pass downwardly in chamber 21 of base 10 and yet prevents it from passing downwardly within cracking chamber 27 defined by spacers 11. While meeting this requirement it is preferred for convenience that the body 28 cover cracking chamber 27 when impacted upon the upper surface of the uppermost spacer 11 defining the cracking chamber 27. To accomplish this end preferably the striking plate 28 has a width and length each approximately 2 inches greater than the corresponding dimensions of the cracking chamber 27 so that approximately 1 inch margins of the cracking plate 28 will extend beyond the periphery of cracking chamber 27 when the striker plate is diametrically centered thereover. The striker plate 28 for convenience of manipulation carries vertically upwardly extending handle 29 positioned in its medial portion and structurally interconnected therewith.

For effective operation of my nutcracker the striker plate 12 must be impacted upon the upper surface of nut shells to cause cracking force. This requires that the striker plate body 28 be formed of some hard rigid material of substantial density to create an appropriate impact force upon nut shells to be cracked. The materials of preference for formation of the striker plate 28 is a harder more dense metal such as iron or steel. Preferably the striker plate should have a configuration such that when formed of iron or steel it will have a mass of at least 4 to 10 pounds to be fairly readily manually manipulable and yet sufficiently massive to provide appropriate impact to crack nuts 13 in the cracking chamber 27.

Having described the structure of my nutcracker system its operation may be understood.

The nutcracker system produced in accordance with the foregoing specification is assembled and positioned on the support 14 having two substantially horizontal surfaces adjacent to each other at different vertical heights such as on a raised porch and associated stair structure as illustrated in FIG. 1. Base 10 is positioned with its front 20 at or slightly forwardly of the forward or outer edge of the upper horizontal surface and the waste container 16 is positioned with its rearward or inner edge below and preferably slightly under the forward edge of base 10 so that shelled nut debris may be removed from chamber 21 through medial slot 22 in the base and thence moved by gravity downwardly into waste container 16.

Bottom plate 23 is then placed on bottom 17 of base 10, if not previously so established. One or more spacers 11 are chosen for use with the particular batch of nuts to be cracked. The spacer or spacers 11 are chosen so that when stacked vertically above each other their total vertical height will be approximately 80% to 90% of the average height of nuts 13 to be cracked so that when a batch of nuts 13 are placed in the cracking chamber 27 defined by the one or more spacers approximately 10% to 20% of the nuts will project above the upper surface of the uppermost spacer 11. The best and most desirable amount of projection of in-shell nuts for cracking must be determined empirically as it varies with various factors related to the particular nuts to be cracked. If the nut have a small variance in average vertical height or have shells that are easily fractured, the required projection of the nut shells above the upper surface of the upper spacer 11 may be in the lower operable range indicated whereas greater variance in average vertical heights of nuts and tough nut shells having low frangibility, such as in the case of black walnuts, nuts shells having high moisture content or nut shells having substantial size variance, would be in the higher operable range. The desirable operative range is also affected by the amount of impacting force applied to the nut shells and how that force is applied. The most desirable depth of the cracking chamber generally may be quite easily determined empirically by an average user of the nut cracking system with little effort and in a relatively short period of experimentation.

After the system is assembled and positioned as aforesaid, a batch of nuts 13 to be cracked is established in the cracking chamber 27 in a loosely packed single layer, preferably with at least some of the nuts having portions of their shells in immediate adjacency.

With the nut batch arrayed in the cracking chamber 27, the striker plate 12 is manually grasped by handle 29 and moved to a position over and spacedly above cracking chamber 27. The striker plate 12 then is manually manipulated to move downwardly, normally with some acceleration in addition to that provided by the force of gravity, to impact upon portions of nut shells projecting the cracking chamber and move downwardly as those shells are cracked to be stopped by contact with the upper surface of the uppermost spacer 11. The striker plate 12 then is manually moved vertically upwardly and out of base chamber 21. If any significant number of nut shells appear to be uncracked and to extend above the upper surface of the upper spacer plate, the impacting operation may be continued so long as necessary until all or substantially all of the crackable nuts in the cracking chamber have been cracked. Normally one or two impacting procedures are sufficient to crack substantially all of a nut batch. No more impacting than necessary should be used as it may tend to break up nut meat kernels in the cracking chamber.

After completion of the cracking process of a nut batch, striker plate 12 is stored, commonly on the upper surface of base 10 or support 14, and the spacer or spacers 11 in chamber 21 of the base 10 are removed upwardly from chamber 21 and stored, commonly on support 14 as indicated in FIG. 3C. The meat kernels of nuts 13 then are manually removed from chamber 21 and stored for further use as shown in FIG. 3D. In this regard it is to be noted that the bottom of cracking chamber 27 is areally smaller than the exposed upper surface of bottom plate 23, so the nut meat kernels and shell debris will tend to spread in a somewhat looser array on the bottom plate 23 when the spacers 11 are removed to aid in finding and manually recovering the nut meat kernels.

After recovery and removal of the nut meat kernels from the base chamber 21, the debris remaining on bottom plate 23 is moved into waste container 16. This removal is accomplished by manual manipulation and may be aided by known tools such as brush 15. By reason of the positional relationship of waste container 16 relative to base 10, nut shell debris may be moved forwardly in chamber 21 and pushed out through medial slot 22 in front 20 to allow gravity to move the shell debris downwardly and into the adjacently underlying waste container 16 for containment and subsequent disposition. The nutcracker system now is ready for use on an additional batch of nuts in the same fashion as described for the first batch of nuts.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope. My invention is not intended to be limited other than by the claims appended hereto and forming a part hereof.

Having thusly described my invention, what I desire to protect by Letters Patent, and

What I claim is:

1. A nutcracker system comprising in combination:
   a base having a bottom interconnecting two similar sides, a back and a front all interconnected with each other to define an open top base chamber, said front having a medial slot extending vertically therethrough;
   at least one spacer having a peripheral configuration to fit in immediate adjacency with the vertical sides of the base defining the base chamber, said at least one spacer defining a medial cracking chamber orifice and having a tab-like protuberance extending outwardly from the periphery to fit in and through the slot defined in the front of the base; and
   a striker plate having a plate-like body defining a lower substantially planar surface, having at least one dimension greater than the greatest dimension of the cracking chamber orifice defined in the at least one spacer and carrying a medially positioned upwardly extending handle to aid manual manipulation of the striker plate to impact upon the upper surface of the at least one spacer.

2. The nutcracker system of claim 1 further including:
   a bottom plate formed of a planar sheet of hard rigid dense material and having a peripheral configuration to fit on the upper surface of the bottom and in immediate adjacency to the base sides defining the chamber base.

3. The nutcracker system of claim 1 wherein the at least one spacer comprises a plurality of substantially similarity peripherally configured spacers defining similar cracking chamber orifices that in a stacked array of more than one spacer define a cracking chamber of adjustable vertical dimensions.

4. The nutcracker system of claim 1 wherein the at least one spacer defines a cracking chamber having a depth of from eighty percent to ninety percent of the average vertical dimension of a batch of nuts carried within the cracking chamber to allow cracking of the nuts by impact of the striker plate thereon.

5. The nutcracker system of claim 1 wherein the striker plate is formed of hard rigid dense metallic material and the striker plate body has a peripheral configuration similar to but areally larger than the cracking chamber defined by the at least one spacer but less than the bottom to fit within the chamber defined by the base and extend spacedly beyond the periphery of the cracking chamber.

6. The nutcracker system of claim 1 further having:
   a waste container with a lateral dimension greater than the lateral dimension of the medial slot in the front of the base, said waste container positioned beneath the bottom of the base and extending from beneath the base spacedly forwardly thereof to receive cracked nut debris from the chamber of the base; and
   a bristle brush not wider than the lateral dimension of the slot in the front of the base to aid removal of cracked nut debris from the base chamber and into the waste container.

7. The nutcracker system of claim 6 wherein the at least one spacer comprises a plurality of similarly configured spacers of different thicknesses positionable in the chamber of the base in stacked array to define a cracking chamber of adjustable vertical dimension.

8. A nutcracker system comprising in combination:
   a base having a bottom interconnecting two similar sides, a back and a front, all interconnected with each other, to define an open top base chamber, said front having a medial slot extending vertically therethrough, and
   a bottom plate formed of hard rigid dense material having a substantially planar upper surface and a peripheral configuration to fit upon the upper surface of the bottom and in immediate adjacency to inner surfaces of the back, front and sides defining the chamber;
   at least one spacer having a peripheral configuration to fit on the upper surface of the bottom plate and in immediate adjacency to the inner surfaces of the back, front and sides of the base defining the base chamber, said at least one spacer defining a medial cracking chamber orifice, having a vertical dimension of from eighty percent to ninety percent of the average vertical dimension of a batch of nuts to be carried within the cracking chamber to allow cracking of the nuts by impact of a striker plate thereon, and having a tab-like protuberance extending outwardly from the periphery to fit in and through the slot defined in the front of the base; and
   a striker plate formed of hard rigid dense material and having
      a lower substantially planar surface with at least one dimension greater than the greatest dimension of the cracking chamber orifice defined in the at least one spacer, and
      carrying a medially positioned upwardly extending handle to aid manual manipulation of the striker plate to impact upon the upper surface of the at least one spacer and nuts carried in and projecting above the medial cracking chamber orifice of the at least one spacer.

9. The process of cracking a plurality of configurationally similar frangible shelled nuts in a cracking system having a peripherally defined open top base defining a base chamber with a bottom supporting a hard rigid dense bottom plate and at least one spacer defining a medial cracking chamber orifice having a vertical dimension of from eighty percent to ninety percent of the average vertical dimension of a batch of nuts carried within the cracking chamber, comprising the steps of:
   placing a plurality of nuts to be cracked in the cracking chamber in loosely packed array with at least some nuts in immediate contact with adjacent nuts;
   manually manipulating a striker plate, formed of hard rigid dense material with a peripheral configuration smaller than the base chamber and larger than the cracking chamber orifice, from above the cracking chamber to impact on nuts projecting upwardly above the upper surface of the spacer defining the cracking chamber orifice and on the upper surface of the spacer;

removing the striker plate and the at least one spacer from the base chamber;

manually separating nut meats from shell debris in the base chamber and removing the nut meats from the base chamber;

removing the shell debris from the base chamber for disposition to allow reuse of the base chamber.

* * * * *